UNITED STATES PATENT OFFICE.

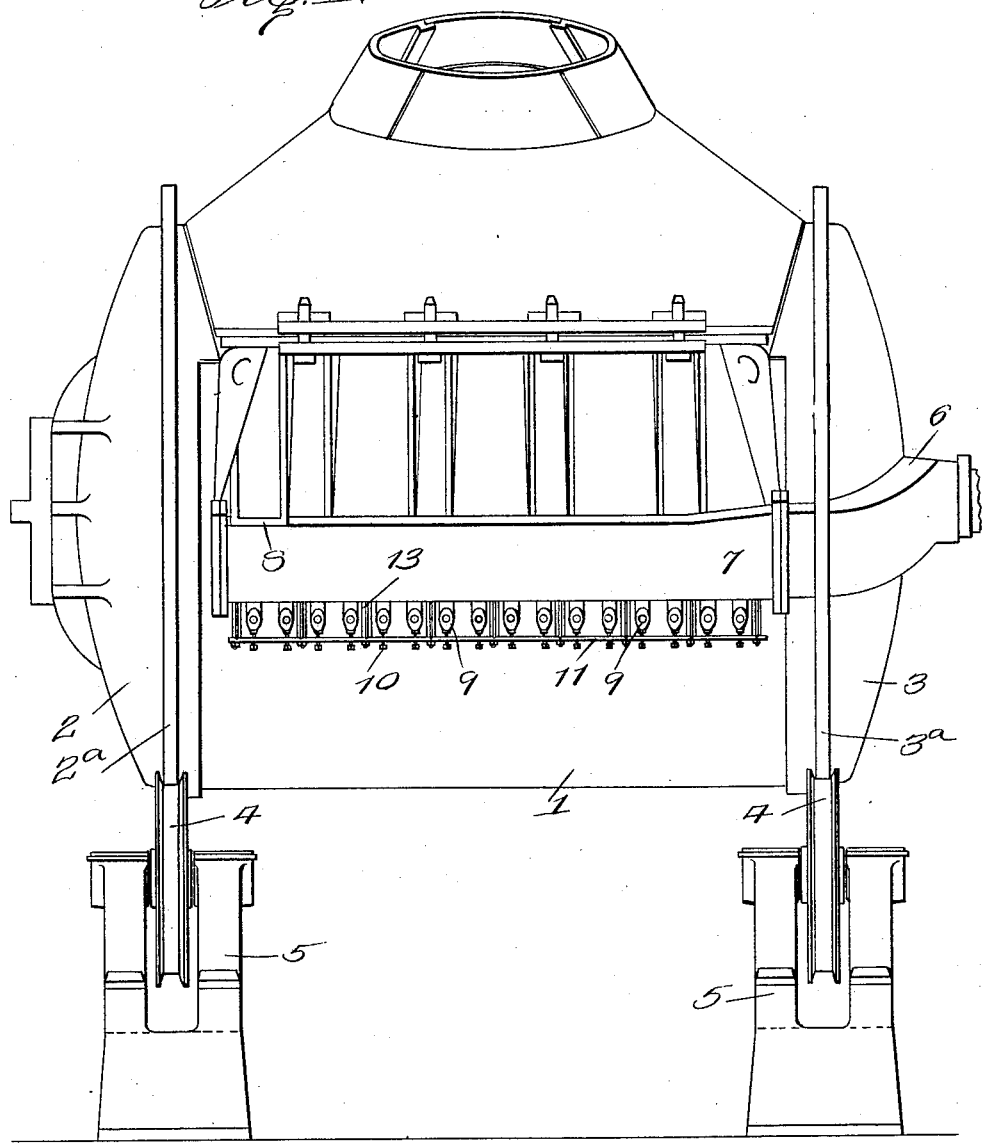

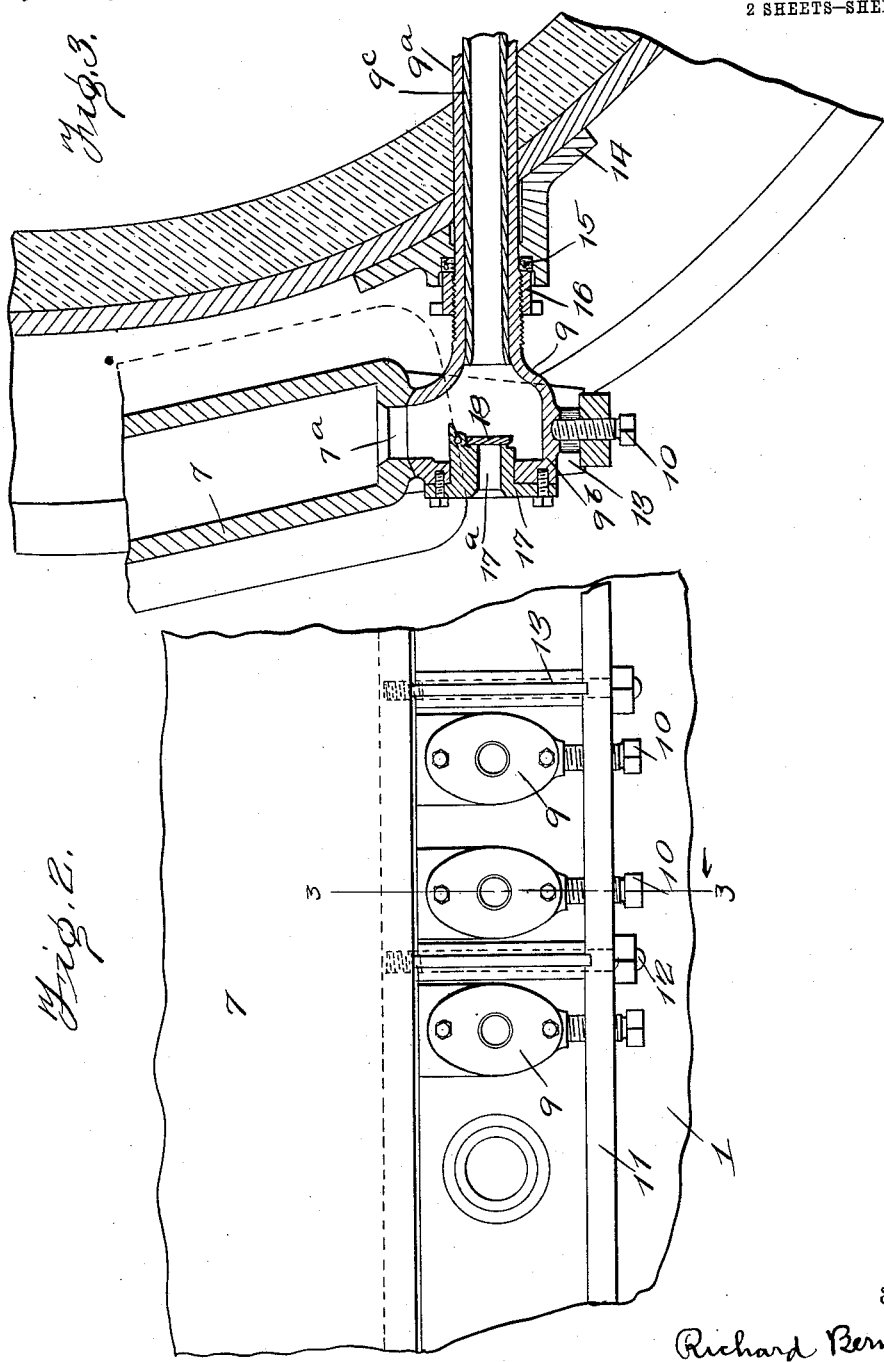

RICHARD BERNHARD, OF CUDAHY, WISCONSIN, ASSIGNOR TO POWER & MINING MACHINERY COMPANY.

TWYER.

1,097,907. Specification of Letters Patent. Patented May 26, 1914.

Application filed August 18, 1908. Serial No. 449,136.

*To all whom it may concern:*

Be it known that I, RICHARD BERNHARD, a citizen of the United States, residing at Cudahy, in the county of Milwaukee and State of Wisconsin, have invented certain new and useful Improvements in Twyers, of which the following is a specification, reference being had therein to the accompanying drawing.

My invention relates to twyers for converters, blast, smelting and other furnaces.

It consists in certain features of construction and combinations of parts, the objects of which are to produce a twyer construction which is highly satisfactory in operation, which can be produced at a lower cost than prior constructions, and in which the individual twyers can readily and easily be detached and replaced in case of need.

The nature and object of the invention will be fully and clearly understood from the following description in connection with the accompanying drawings in which—

Figure 1 is a side elevation of a converter of the tipping or oscillating type, embodying my invention; Fig. 2 is a fragmentary elevation showing some of the twyers and adjacent parts of the converter shell and wind box, and Fig. 3 is a vertical transverse section on the line 3—3 in Fig. 2.

Referring to the construction in detail, 1 indicates the body of the converter having heads 2 and 3, which are provided with riding rings $2^a$ and $3^a$ respectively. These rings rest in grooved supporting wheels 4 which are suitably mounted on bearing blocks 5.

The right head of the converter is formed with a blast conduit 6 which extends from the axis of the converter outward to and through the riding ring $3^a$ and terminates in a flanged end which is adapted to be coupled to the wind box 7, extending along the wall of the inverted shell. The wind box 7 is suppported at one end by its connection with the flanged end of the conduit 6, and at its other end by a bracket 8.

9, 9 are the twyers which conduct the blast from the wind box 7 into the converter. These twyers comprise a tubular part $9^a$ which extends through the wall of the converter and an elbow-shaped head part $9^b$ which connects with the lower side of the wind box 7, the latter being formed with a series of apertures $7^a$ which register with the upwardly disposed openings of the twyers. The twyers are provided with lining tubes $9^c$ of suitable material.

Preferably a spherical or ball and socket engagement is provided between the wind box and the twyers, the latter being pressed against the wind box so as to insure a tight joint by means of set screws 10 which engage the lower sides of the twyers. These set screws are mounted in a bar 11 which is rigidly supported by means of stud bolts 12 which are threaded into the lower side of the wind box, and by distance or separating plates 13, the latter being formed with a central tubular part through which the said bolts extend.

The shell of the converter is provided with reinforcing plates 14 at the points where the twyers pass through the shell and these plates are grooved or recessed to receive compressible packing 15 of asbestos or the like which insures a tight joint between the twyer and the shell. The packing 15 is held securely in place by means of an adjustable gland 16 threaded upon a tubular part of the twyer.

With such a construction it is practically impossible for the packing to be blown out, and inasmuch as the gland may be adjusted to compress the packing, the latter need not be large or thick. The twyers are made of cast iron and I prefer to make the gland 16 of brass so that it cannot rust tight on the twyer and thus prevent its ready adjustment.

The outer ends of the twyers are closed by plates 17 having apertures or poke holes $17^a$ in line with the tubular part of the twyer, these apertures $17^a$ being normally closed by valves 18 which are suitably hinged to the plates 17.

The valve construction shown constitutes no part of my invention, and it will be understood that any suitable valve construction may be used in connection with my invention.

The operation of the invention, so far as the functions of the converter are concerned, will be clear without any further description. It will also be clear to those familiar with apparatus of the kind in question that the construction described possesses marked advantages over those which have been proposed theretofore.

It will be understood that in Fig. 3 the curvature of the bearing surfaces of the air box and of the twyer is exaggerated to make the showing more clear, and it will also be understood that a certain looseness is provided between the twyer and the walls of the aperture in the converter which together with the resiliency of the twyer permits the twyer to be readily disengaged from the air box and removed when the set-screw 10 is loosened.

It will be seen that each individual twyer can be quickly and easily removed for repairs or replacement by simply loosening the set screw which holds it in engagement with the wind box; and when the twyer is returned to position, the connection with the wind box is made with ease, the spherical or round end of the twyer finding its seat automatically as the set screw is turned up to form a tight connection. The importance of having the securing means freely exposed, so that it can be easily engaged by a wrench or other tool, will be appreciated by those who are familiar with the prior bolted flange constructions. At least two bolts must be used in such bolted flange connections and by reason of the necessarily close spacing of the twyers, one of the bolts is of necessity practically inaccessible and it has been found very difficult for this reason to remove and replace the twyers when constructed in such a manner. Again it will be clear that by reason of the ball and socket connection between the twyer and wind box, the accurate alinement of the latter with respect to the shell, which is necessary in the case of plain flanged connections, is not essential; and in consequence my construction results in a material reduction of the cost incident to the accurate machine work and assembling required in the case of prior construction such as that referred to.

The direct ball and socket engagement which I employ obviously provides a very short and direct path for the compressed air between the wind box and the interior of the converter or furnace.

The gland-pressed packing which I employ is an improvement over the prior practice inasmuch as it insures a tight joint between the twyer and the shell of the converter, the gland preventing the blowing out of the packing and being readily adjusted to compress the packing as much as may be desired.

What I claim is:—

1. In apparatus of the class described, the combination of a converter or furnace shell apertured to receive a series of twyers, a wind-box extending along the converter or furnace wall and formed with a series of apertures, a series of twyers having their discharge ends extending through the converter or furnace shell and their inlet passages in register with the apertures of the wind-box, the inlet passage of each twyer extending laterally with relation to the discharge passage thereof, and means for securing each twyer to the wind-box comprising a single adjustable support engaging the wall of the twyer opposite its inlet passage to press it into tight engagement with the wind-box, substantially as set forth.

2. In apparatus of the class described, the combination of a converter or furnace shell suitably apertured to receive twyers, a wind box having its wall formed with a series of apertures, a series of twyers having the inlet ends of their passages in register with the apertures of the wind box, and rigidly held adjustable supports engaging the sides of the twyers opposite their inlets to press them into tight engagement with the wind box, said twyers having ball and socket engagement with the wind box, substantially as set forth.

3. In apparatus of the class described, the combination of a converter or furnace shell suitably apertured to receive twyers, a wind box having its wall formed with a series of apertures, a series of twyers having the inlet ends of their passages in register with the apertures of the wind box, a bar rigid with respect to the shell and wind box, and a series of set screws, each adjustably mounted in said bar in position to engage the side of a twyer opposite its inlet and press it into tight engagement with the wind box, substantially as set forth.

4. In apparatus of the class described, the combination of a converter or furnace shell suitably apertured to receive twyers, a wind box having its wall formed with a series of apertures, a series of twyers having the inlet ends of their passages in register with the apertures of the wind box, a bar rigid with respect to the shell and wind box, and a series of set screws, each adjustably mounted in said bar in position to engage the side of a twyer opposite its inlet and press it into tight engagement with the wind box, said twyers having ball and socket engagement with the wind box, substantially as set forth.

5. In apparatus of the class described, the combination of a converter or furnace shell suitably apertured to receive twyers a wind box having its wall formed with a series of apertures, a series of twyers having the inlet ends of their passages in register with the apertures of the wind box, a bar rigid with respect to the shell and wind box, and a series of adjustable fastening devices, each mounted on said bar in position to engage the side of a twyer opposite its inlet and press it into tight engagement with the wind box, substantially as set forth.

6. In apparatus of the class described, the combination of a converter or furnace shell suitably apertured to receive twyers, a wind box having its wall formed with a series of apertures, a bar parallel to the wind box and rigidly supported therefrom, a series of twyers disposed between the wind box and the said bar with the inlet ends of their passages in register with the apertures of the wind box, and a series of set screws adjustably mounted in the aforesaid bar, each engaging a twyer to press it into tight engagement with the wind box, substantially as set forth.

7. In apparatus of the class described, the combination of a converter or furnace shell suitably apertured to receive twyers, a wind box having its wall formed with a series of apertures, a bar parallel to the wind box and rigidly supported therefrom, a series of twyers disposed between the wind box and the said bar with the inlet ends of their passages in register with the apertures of the wind box, and a series of set screws adjustably mounted in the aforesaid bar, each engaging a twyer to press it into tight engagement with the wind box, said twyers having ball and socket engagement with the wind box, substantially as set forth.

8. In apparatus of the class described, the combination of a converter or furnace shell suitably apertured to receive twyers, a wind box having its wall formed with a series of apertures, a series of twyers having the inlet ends of their passages in register with the apertures of the wind box, a series of adjustable pressure devices each arranged to engage the side of a twyer opposite its inlet and press it into tight engagement with the wind box, and a common support for said pressure devices, substantially as set forth.

9. In apparatus of the class described, the combination of a converter shell suitably apertured to receive twyers, a wind box having its wall formed with a series of apertures, a series of closely arranged twyers having the inlet ends of their passages in register with the apertures of the wind box, a series of adjustable pressure devices each engaging a twyer to press it into tight engagement with the wind box and being disposed in the axial plane of its twyer and freely exposed for operating engagement, and a common support for said pressure devices, substantially as set forth.

In testimony whereof I affix my signature, in presence of two witnesses.

RICHARD BERNHARD.

Witnesses:
L. F. SNYDER,
HUGO H. GEISENHEINER.

---

Copies of this patent may be obtained for five cents each, by addressing the "Commissioner of Patents, Washington, D. C."